Figure 1:
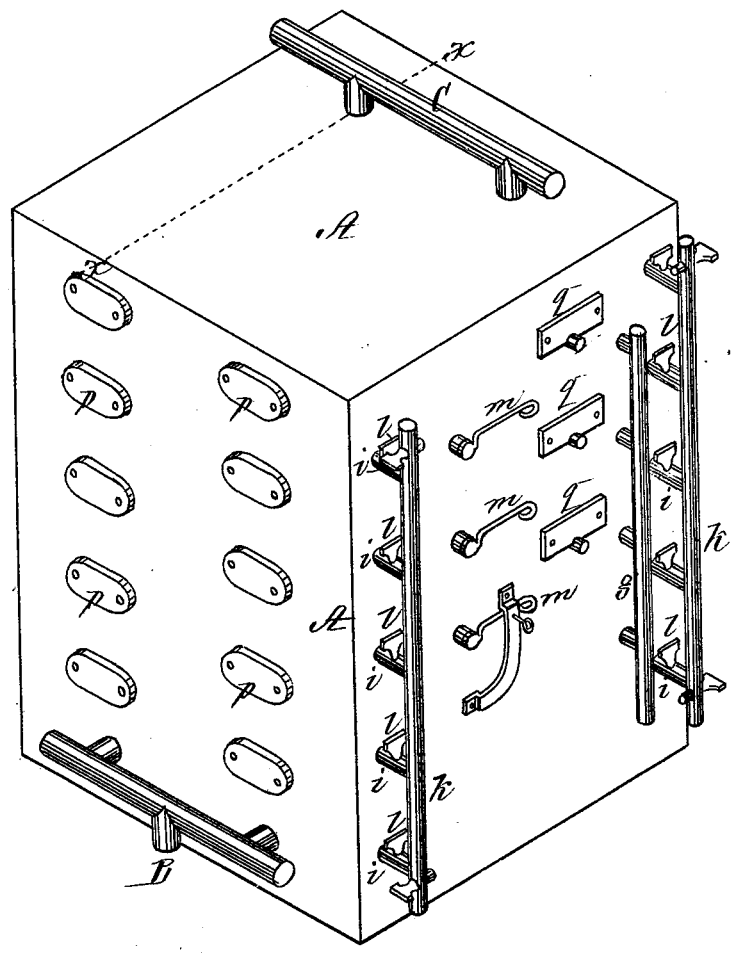

2 Sheets—Sheet 1.

R. A. CROSS.
Apparatus for Washing and Condensing Coal-Gas.

No. 203,003. Patented April 30, 1878.

Witnesses,
N. J. Cambridge
J. E. Cambridge

Inventor,
Robert A. Cross,
per
Teschemacher & Stearns,
Attorneys.

2 Sheets—Sheet 2.
R. A. CROSS.
Apparatus for Washing and Condensing Coal-Gas.
No. 203,003. Patented April 30, 1878.
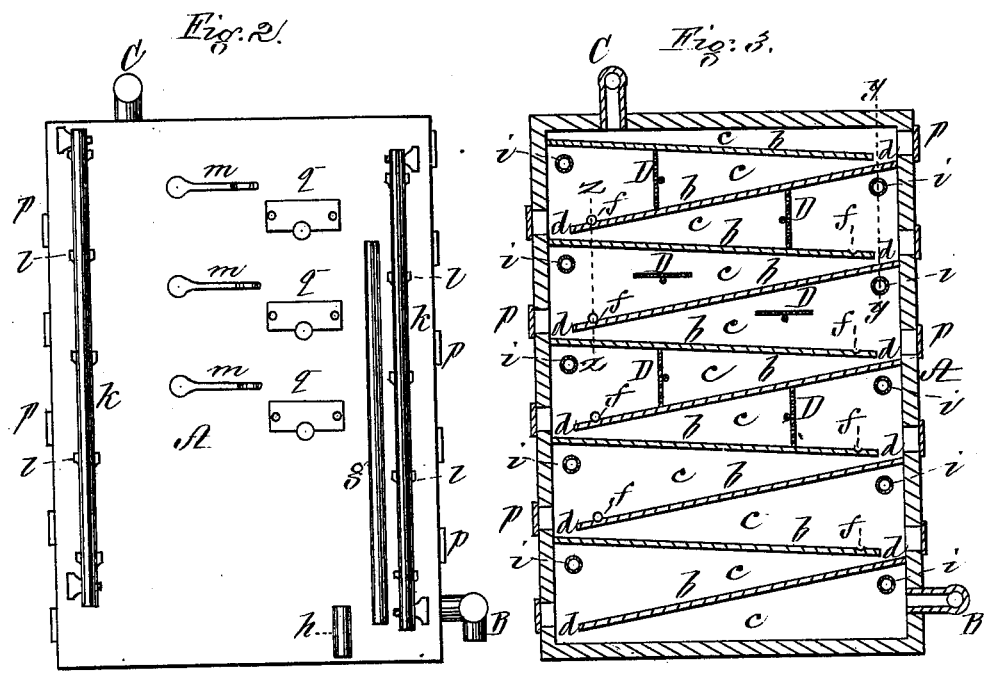
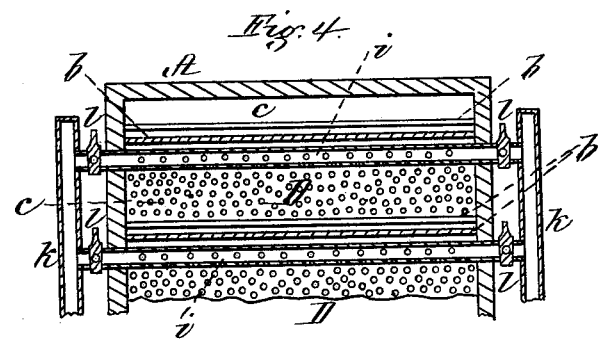
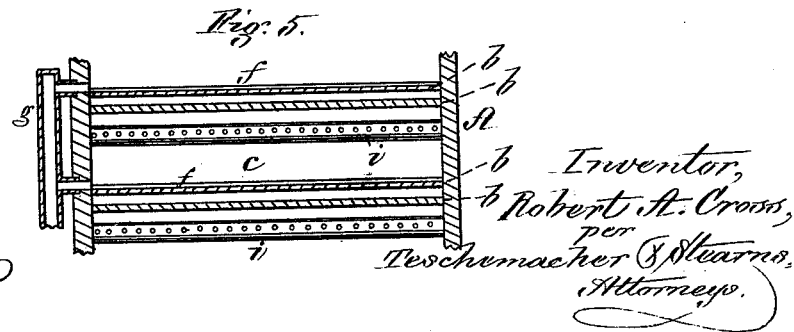
Witnesses,
N. J. Cambridge
J. E. Cambridge
Inventor,
Robert A. Cross,
per
Teschemacher & Stearns,
Attorneys.

UNITED STATES PATENT OFFICE.

ROBERT A. CROSS, OF BOSTON, MASSACHUSETTS.

IMPROVEMENT IN APPARATUS FOR WASHING AND CONDENSING COAL-GAS.

Specification forming part of Letters Patent No. 203,003, dated April 30, 1878; application filed February 23, 1878.

*To all whom it may concern:*

Be it known that I, ROBERT A. CROSS, of Boston, in the county of Suffolk and State of Massachusetts, have invented certain Improvements in Apparatus for Condensing and Washing Coal-Gas, of which the following is a full, clear, and exact description, reference being had to the accompanying drawings, making part of this specification, in which—

Figure 1 is a perspective view of a condenser and washer for coal-gas constructed in accordance with my invention. Fig. 2 is an elevation of one side of the same. Fig. 3 is a vertical section through the same on the line $x$ $x$ of Fig. 1. Fig. 4 is a vertical section through the same on the line $y$ $y$ of Fig. 3. Fig. 5 is a vertical section through the same on the line $z$ $z$ of Fig. 3.

My invention relates to certain improvements in apparatus for condensing and washing coal-gas, and has for its object to facilitate and perfect these operations; and my invention consists in a closed receptacle provided with a series of inclined partitions or division-plates extending across it from side to side, and arranged one above another in such a manner that the gas entering at the bottom of the receptacle will be compelled to pass upward, over, and in contact with all of the partitions, which thus present an extended area of cooling-surface, which facilitates the condensation of the gas and causes a rapid separation of the tar and ammoniacal liquor therefrom, these products of condensation falling onto the inclined partitions, and thence passing to troughs or gutters connected therewith, from which they are drawn off by suitable pipes; and my invention furthermore consists in providing one or more of the chambers or spaces between the division-plates with one or more perforated plates, arranged in such a manner as to compel the gas to pass through the perforations, whereby it is divided into fine streams, in which state it can be more rapidly and perfectly cooled and condensed, and the operation thus facilitated.

To enable others skilled in the art to understand and use my invention, I will proceed to describe the manner in which I have carried it out.

In the said drawings, A represents a gas-tight rectangular receptacle or casing, formed of boiler-iron or other suitable material, within which are secured a series of inclined partitions or division-plates, $b$, extending entirely across the interior from side to side, and arranged one above another, as seen in Fig. 3, in such a manner as to form a series of wedge-shaped chambers, $c$, which communicate with each other through long narrow apertures $d$ between the partitions, these apertures being formed alternately on opposite sides of the receptacle A, a space being left along the line of the aperture $d$, between one edge of each partition $b$ and the adjacent side of the receptacle A.

The gas from the retort-house is introduced into the bottom of the receptacle A through the inlet-pipe B, and by the arrangement of the partitions $b$ and apertures $d$ is compelled, in its ascent, to pass in succession through all of the chambers $c$, and over and in contact with all of the partitions $b$, which present an extended area of cooling-surface, thus greatly accelerating the condensation of the gas and the consequent separation of the tar and ammoniacal liquor therefrom, the gas escaping from the upper chamber $c$ through an outlet-pipe, C, by which it is conducted to the purifier.

The condensed matters separated from the gas during this process fall onto the upper surfaces of the inclined partitions $b$, and thence run down into grooves or gutters $f$, one of which is located near the lower edge of each partition $b$, and from these gutters $f$ the tar, &c., is drawn off through suitable pipes $g$, (one on each side of the apparatus,) the outlets of which are sealed in a well-known manner to prevent the escape of gas; and by thus providing each partition with a separate gutter and discharge-outlet the impurities deposited in one chamber are quickly carried off and prevented from dropping into the next one below, and consequently the gas in its upward passage is not compelled to pass over large accumulations of the products of condensation, which would retard the purifying process.

The tar, &c., is discharged from the lower chamber $c$ through a pipe, $h$, having its outlet properly sealed.

The wedge form of the chambers c causes the stream of gas to be contracted, so that when it passes through the apertures d the particles of tar held in suspension will be brought close together, and on the gas rising into the chambers above it will suddenly expand, the lighter portion rising quickly and leaving the heavy particles upon the surfaces of the partitions, which greatly facilitates the separation of the impurities from the gas.

Each of the chambers c is provided at its wider end with a perforated pipe, i, each end of which is connected with a vertical pipe, k, outside the receptacle A, this pipe k being connected with an elevated tank (not shown) containing water or weak ammoniacal liquor, which thus enters the pipes i under pressure, and is discharged through the perforations in the form of spray into the chambers c in such a manner that the gas, in its upward passage, is compelled to pass through it, whereby the gas is thoroughly washed and the cooling process materially assisted, causing the condensation of the gas and the separation of the tar and ammoniacal liquor therefrom to be greatly accelerated, the liquid discharged from the pipes i running into the gutters f, and thence to the pipes g in communication therewith.

The pipes i are each provided with a valve or stop-cock, l, by which the spray can be cut off at will from any particular chamber desired.

A number of the chambers c are each provided with a perforated sheet-metal partition, D, which is hung in suitable bearings and operated by a lever or handle, m, by which it can be turned so as to extend vertically across the chamber, and thus compel the gas to pass through its perforations, whereby the gas is divided into fine streams, in which state it can be more rapidly and perfectly cooled in its passage through the chambers c; and as the combined area of the perforations of each partition D is greater than that of the cross-section of the inlet-pipe by which the gas is admitted to the apparatus, no back pressure will be produced. When, however, one or more of the partitions D are not required for use, they may be turned by their levers so as to present only their edges to the flow of the gas.

If desired, these partitions may be rigidly secured in place, instead of being made movable, as shown, and a single perforated partition-plate, D, may be used in connection with one of the chambers c, or any desired number of the chambers may be provided with these perforated partitions.

p are covered man-holes, through which access can be had to the chambers c, and q are covered apertures, through which the perforated partitions D can be removed.

When the apparatus requires to be cleaned the pipes i k may be employed to admit steam into the interior of the apparatus, to soften the accumulation of tar on the partitions b and D and cause it to flow to the discharge-pipes, as required.

What I claim as my invention, and desire to secure by Letters Patent, is—

1. The closed receptacle A, provided with inlet and outlet passages for the gas, and a series of inclined partitions, b, forming chambers c, communicating with each other through apertures d, in combination with grooves or gutters f, connected with the inclined partitions, and leading to suitable discharge-outlets, substantially as and for the purpose set forth.

2. The combination of one or more perforated partitions, D, with one or more of the chambers c, formed between the partitions b, substantially as and for the purpose set forth.

Witness my hand this 19th day of February, A. D. 1878.

ROBERT A. CROSS.

In presence of—
P. E. TESCHEMACHER,
N. W. STEARNS.